United States Patent
Lyashevsky

(10) Patent No.: US 9,495,718 B2
(45) Date of Patent: Nov. 15, 2016

(54) SYSTEM AND METHOD FOR PROVIDING LOW LATENCY TO APPLICATIONS USING HETEROGENEOUS PROCESSORS

(71) Applicant: ADVANCED MICRO DEVICES, INC., Sunnyvale, CA (US)

(72) Inventor: Alexander Lyashevsky, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 112 days.

(21) Appl. No.: 13/912,438

(22) Filed: Jun. 7, 2013

(65) Prior Publication Data

US 2013/0328891 A1    Dec. 12, 2013

Related U.S. Application Data

(60) Provisional application No. 61/657,404, filed on Jun. 8, 2012.

(51) Int. Cl.
| | |
|---|---|
| *G09G 5/36* | (2006.01) |
| *G06T 1/20* | (2006.01) |
| *G06T 15/00* | (2011.01) |
| *G06T 1/00* | (2006.01) |
| *G06F 9/50* | (2006.01) |
| *G06F 17/30* | (2006.01) |

(52) U.S. Cl.
CPC ............... *G06T 1/00* (2013.01); *G06F 9/5033* (2013.01); *G06F 17/30519* (2013.01); *G09G 5/363* (2013.01); *G06T 15/005* (2013.01)

(58) Field of Classification Search
CPC .......... G09G 5/363; G06T 1/20; G06T 15/005

USPC .......................................... 345/502, 503, 506
See application file for complete search history.

(56) References Cited

U.S. PATENT DOCUMENTS

| | | | |
|---|---|---|---|
| 7,554,959 B1 * | 6/2009 | Dowling | 370/338 |
| 2011/0210982 A1 * | 9/2011 | Sylvan et al. | 345/629 |
| 2012/0158817 A1 * | 6/2012 | Lauderdale | G06F 9/46 709/201 |

OTHER PUBLICATIONS

Stuart et al., GPU-to-CPU Callbacks, UC Davis, In Third Workshop on UnConventional High Performance Computing (UCHPC 2010), Aug. 2010.*

(Continued)

*Primary Examiner* — Matthew Salvucci
(74) *Attorney, Agent, or Firm* — Volpe and Koenig, P.C.

(57) ABSTRACT

Methods, apparatuses, and computer readable media are disclosed for responding to requests. A method of responding to requests may include receiving requests comprising callback functions. The one or more requests may be received in a first memory associated with processors of a first type, which may be CPUs. The requests may be moved to a second memory. The second memory may be associated with processors of a second type, which may be GPUs. GPU threads may process the requests to determine a result for the requests, when a number of the requests is at least a threshold number. The method may include moving the results to the first memory. The method may include the CPUs executing the one or more callback functions with the corresponding result. A GPU persistent thread may check the number of requests to determine when a threshold number of requests is reached.

20 Claims, 10 Drawing Sheets

(56) References Cited

OTHER PUBLICATIONS

Schill et al., "Distributed Application Support: Survey and Synthesis of Existing Approaches", Information and Software Technology, Elsevier, Amsterdam, NL, vol. 32, No. 8, Oct. 1, 1990, pp. 545-558.
Sandberg, R., "The Sun Network Filesystem: Design, Implementation and Experience", Proceedings of the Summer Usenix Conference, Jan. 1, 1986, pp. 1-16.
G.C. Pirkola, "A File System for a General-Purpose Time-Sharing Environment", Proceedings of the IEEE, vol. 63, No. 6, Jun. 1, 1975, pp. 918-924.
Jain, R., "A Comparison of Hashing Schemes for Address Lookup in Comuter Networks", IEEE Transactions on Communications, IEEE Service Center, Piscataway, NJ, USA, vol. 40, No. 10, Oct. 1, 1992, pp. 1570-1573.

\* cited by examiner

```
__kernel gpuGenericApplication(in_control_queue, out_control_queue,
  app_data)
{
  curr_ptr = read_ptr = IDLE;
  do {
    // CACH INBOUND QUEUE POINTER
    read_ptr = get_read_ptr(in_control_queue);
    // CHECK INBOUND SIGNAL
    while(curr_ptr != read_ptr) {
      // INVOKE APPLICATION
      response = Application(appa_data, curr_ptr);
      // PUT RESPONSE INTO OUTBOUND QUEUE
      set_write_ptr(out_control_queue, curr_ptr, response);
      // GET NEXT INPUT
      curr_ptr++;
    }
    // CHECK THE END OF STREAM MESSAGE
    protocol_control = get_control_msg(in_control_queue, curr_ptr);
  } while ( EOS != protocol_control );
}
```

FIG. 8

```
typedef struct {
    uint application_id;
    long long req_id;
    LOLALY_REQ_CALLBACK callback_function;
    uint *req_ptr;
    int req_sz;
    uint *res_ptr;
    int res_sz;
    uint control_bits;
} LOLALY_REQ;

int lolalySendRequest(LOLALY_HANDLE server_handle,
    LOLALY_REQ req);
```

900

902 → uint application_id
903 → long long req_id
904 → LOLALY_REQ_CALLBACK callback_function
906 → int lolalySendRequest(LOLALY_HANDLE server_handle,

FIG. 9

| Request size | GPU/Frequency | Throughput MRs | Bandwidth GBs | Average latency us | GPU/Frequency | Throughput MRs | Bandwidth GBs | Average latency us |
|---|---|---|---|---|---|---|---|---|
| | APU Brazos, HD6310/430 | | | | APU Trinity HD7660/600 | | | |
| 128 | | 1.02 | 1.56 | 85.4 | | 2.43 | 3.74 | 42 |
| 256 | | 0.76 | 1.96 | 97.3 | | 1.87 | 4.78 | 71.5 |
| 512 | | 0.41 | 1.9 | 107.6 | | 1.17 | 5.4 | 88.8 |
| 1024 | | 0.25 | 2.18 | 150.2 | | 0.52 | 4.5 | 110 |
| 2048 | | 0.19 | 3.23 | 197 | | 0.31 | 5.26 | 140 |
| 4096 | | 0.06 | 2.15 | 492 | | 0.16 | 5.52 | 165.4 |

FIG. 10

SYSTEM AND METHOD FOR PROVIDING LOW LATENCY TO APPLICATIONS USING HETEROGENEOUS PROCESSORS

CROSS REFERENCE TO RELATED APPLICATION

This application claims priority to U.S. Provisional Patent Application Ser. No. 61/657,404, filed on Jun. 8, 2012, the entire contents of which are hereby incorporated by reference as if fully set forth.

TECHNICAL FIELD

Embodiments of the invention relate to providing low latency to applications, and more specifically to providing low latency using heterogeneous processors.

BACKGROUND

Some computer systems include more than one processor type. For example, some computer systems include one or more central processor units (CPUs) (i.e., a first processor type) and many peripheral processors—(i.e., a different or second type of processor). The peripheral processors often are graphical processor units (GPU) but other processor types are known to those of ordinary skill. There may be many GPUs that may have a separate shared memory from the CPUs. Some applications use only the CPUs, or use the GPUs in a less than efficient manner.

Additionally, some applications require a low latency or delay from a computer system to respond to a request from the application. Often, additional hardware must be purchased to insure that the delay in responding to a request from an application is not too long.

Therefore, there is a need in the art for systems and methods that provide low latency to applications using heterogeneous processing.

SUMMARY OF EMBODIMENTS

Methods, apparatuses, and computer readable media are disclosed for responding to requests. A method for responding to requests may include one or more central processing units (CPUs) receiving one or more requests. The method may include moving the one or more requests from a first memory associated with the one or more CPUs to a second memory associated with one or more graphical processing units (GPUs). The method may include the one or more GPUs determining a pointer for each of the one or more requests. The pointer may be determined based on information in the request. The method may include moving the determined pointers to the first memory. For each of the determined pointers, the method may include, retrieving data pointed to by the determined pointer. The data may be retrieved from a first data structure in the first memory. And, the method may include the one or more CPUs responding to the received requests by sending the corresponding retrieved data.

In another embodiment, a method of responding to requests may include receiving one or more requests comprising a callback function. The one or more requests may be received in a first memory associated with one or more CPUs. The method may include moving the one or more requests to a second memory. The second memory may be associated with one or more GPUs. The method may include one or more GPU threads processing the one or more requests to determine a result for each of the one or more requests, when a number of the one or more requests is at least a threshold number. The method may include moving the results to the first memory. And, the method may include the one or more CPUs executing each of the one or more callback functions with the corresponding result.

A system for responding to requests is disclosed. The system may include one or more CPUs configured to receive one or more requests comprising a callback function. The one or more requests may be received in a first memory associated with the one or more CPUs. The one or more CPUs may be configured to move the one or more requests to a second memory. The second memory may be associated with one or more GPUs. And, the one or more CPUs may be configured to execute each of the one or more callback functions with a corresponding result. The one or more GPUs may be configured to execute one or more GPU threads to process the one or more requests to determine the result for each of the one or more requests, when a number of the one or more requests is at least a threshold number. And, the one or more GPUs may be configured to move the determined results to the first memory.

BRIEF DESCRIPTION OF THE DRAWINGS

Embodiments of the present invention are illustrated by way of example and not limitation in the figures of the accompanying drawings, in which like references indicate similar elements and in which:

FIG. 8 illustrates a kernel that the GPUs may run according to some disclosed embodiments;

FIG. 9 illustrates a data structure and call for calling the system for low latency applications for heterogeneous processors according to some disclosed embodiments; and FIG. 10 illustrates a table of results of empirical tests of a system and method for providing low latency using heterogeneous processors for memory cache application according to some disclosed embodiments.

DETAILED DESCRIPTION

Figure 1:
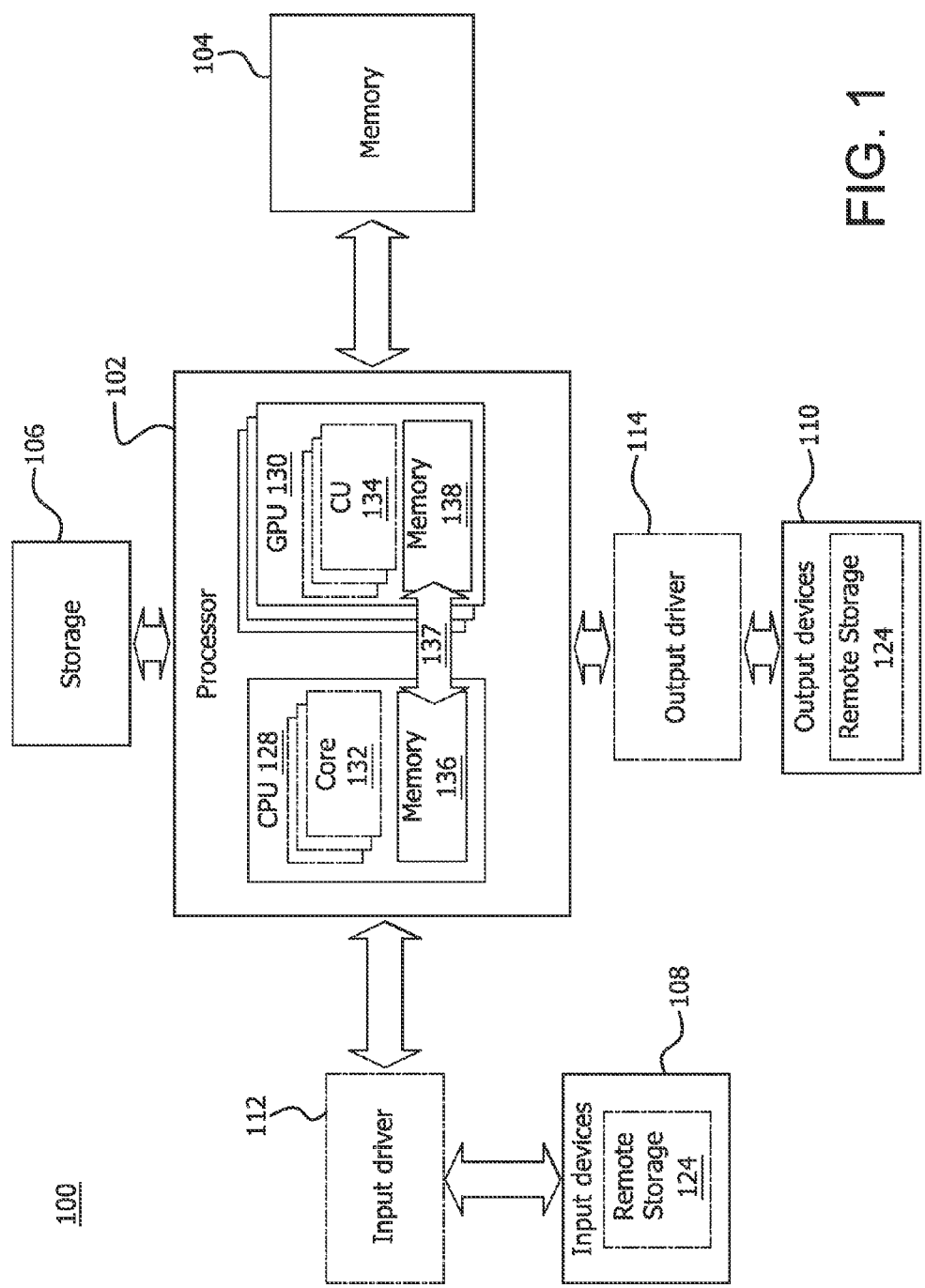
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include one or more first processors having a first type (e.g., central processing units (CPU)) 128, which may include one or more cores 132, and one or more second type of processors such as graphics processing unit (GPU) 130, which may include one or more compute units (CU) 134 or GPU cores. The CPU 128 and GPU 130 may be located on the same die, or multiple dies. The CUs 134 may be organized into groups with a processing control (not illustrated) controlling a group of CUs 134. A processing control may control a group of CUs 134 such that a group of CUs 134 perform as single instruction multiple data (SIMD) processing units (not illustrated). The CU 134 may include a memory 139 that may be shared with one or more other CUs 134. For example, a processing control may control one-hundred and thirty-two CUs 134, and the one-hundred and thirty-two CUs 134 may all share the same memory 139 with the processing control.

In addition to the GPU 130 and the CPU 128 there may be other types of processors or computational elements such as digital signal processors (DSPs), application processors and the like. The CPU 128 may include memory 136 that is shared among cores of the CPU 128. In some disclosed embodiments, the memory 136 is an L2 cache. The GPU 130 may include memory 138 that is shared among the CUs 134 of one or more GPUs 130. Data may be transferred via 137 between the memory 136 and memory 138 and memory 139. The GPU 130 and CPU 128 may include other memories such as memory for each core 132 and memory for each of the processing units of the CU 134 that is not illustrated. The memories 136, 138, and 104 may be part of a coherent cache system (not illustrated). In some embodiments, one or more of the memories 136, 138, and 104 may not be coherent memory. The memory 104 may be located on the same die as the processor 102, or may be located separately from the processor 102. The memory 104 may include a volatile or non-volatile memory, for example, random access memory (RAM), dynamic RAM (DRAM), or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
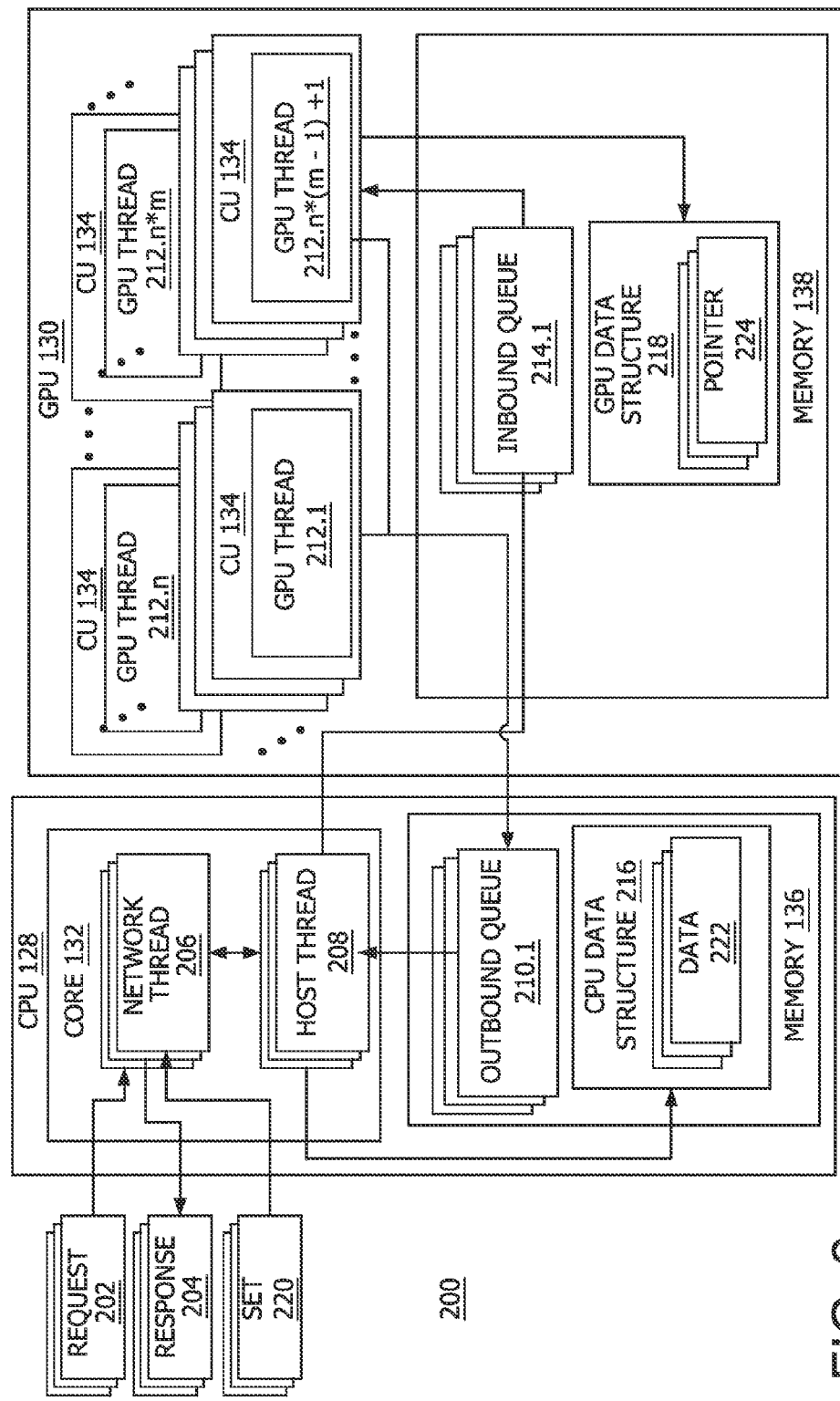
FIG. 2 illustrates a system for low latency applications using heterogeneous processors according to some disclosed embodiments.

FIG. 2 illustrates a system for low latency applications using heterogeneous processors. Illustrated in FIG. 2 is CPU 128, GPU 130, CU 134, memory 138, requests 202, responses 204, sets 220, network thread 206, host thread 208, outbound queues 210, CPU data structure 216, GPU threads 212, inbound queue 214, and GPU data structure 218. Requests 202 are received by the network thread 206 and passed to the host thread 208 which places the requests 202 in the inbound queue 214. GPU threads 212 process the requests 202 in the inbound queue 214 using GPU data structure 218 and send the responses 204 to the outbound queue 210 where the host thread 208 may process the responses 204 using the CPU data structure 216. The responses 204 may then be sent to the network thread 206 for sending. The network thread 206 may receive sets 220 which may be used to create or modify the CPU data structure 216 and the GPU data structure 218.

A request 202 may be a request 202 for information or processing received from an application (not illustrated). A request 202 may be received over a computer network (not illustrated). An example of a request 202 may be a request for data 222 that corresponds to a key in the request 202. A request 202 may include a call back function (see FIG. 9).

A response 204 may be a response 204 to the request 202. An example response 204 may be data 222 that corresponds to a key (see FIG. 3) in a request 202. A set 220 may be an instruction to modify or create the CPU data structure 216. An example set 220 may be a new data 222 to be inserted into the CPU data structure 216.

Network thread 206 may be configured to take requests 202 and sets 220 from an input device 108 and send out responses 204 over the input device 108. For example, the network thread 206 may be a thread in a multitasking operating system that uses sockets to monitor one or more transport control protocol (TCP) ports for requests 202 and sets 220 and sends out responses 204 over one or more ports using TCP. Network thread 206 may be configured to send or pass the requests 202 and sets 220 to a host thread 208 and to receive responses 204 from a host thread 208. The CPU 128 may execute the network thread 206. In some embodiments, the network thread 206 may reside in memory 136 (see FIG. 1), and or memory 104, or another memory (not illustrated) associated with the core 132. In some embodiments, the network thread 206 may be an application thread.

Host thread 208 may be configured to receive requests 202 and place them in an inbound queue 214 for the GPU 130 to process. The host thread 208 may be configured to receive responses 204 from an outbound queue 210. In some disclosed embodiments, the host thread 208 may monitor the outbound queues 210 and when one or more response 204 becomes available the host thread 208 may take the response 204 and perform further processing on the response 204 according to a CPU data structure 216. For example, the host thread 208 may take a response 204 from the inbound queue 214 and use a pointer 224 in the response 204 to retrieve data 222 from the CPU data structure 216, and modify the response 204 to include the data 222. The host thread 208 may then send the response 204 to the network thread 206. In some embodiments, the host thread 208 may satisfy a response 204 if the number of responses 204 is below a threshold number or frequency. In some embodiments, there may be more than one host thread 208. In some embodiments, there may be one host thread 208 per outbound queue 210. In some embodiments, the host thread 208 may reside in a memory associated with the CPU 128. In some embodiments, the network thread 206 may reside in memory 136, and or memory 104, or another memory (not illustrated) associated with the core 132.

Outbound queue 210 may be a queue where the requests 202 that have been processed by the GPU threads 212 are placed. In some embodiments, the number of outbound queues 210 and the number of host threads 208 may be proportional. In some embodiments, there may be one outbound queue 210 per host thread 208. In some embodiments, the outbound queue 210 may reside in memory 136 or another memory accessible to the CPU 128.

GPU threads 212 may be configured to process a request 202. In some embodiments, the GPU 130 may be organized into m groups of n GPU threads 212 each. A group of n GPU threads 212 may each run on a separate CU 134. For example, n may be 64 and m may be 24. Then there would be 64*24 or 1536 GPU threads 212. There may be an inbound queue 214 for each of the group of n GPU threads 212. For example, inbound queue 214.1 may be serviced by GPU threads 212.1 through 212.n. The group of n GPU threads 212 may be single instruction multiple data (SIMD) CUs 134. The group of n GPU threads 212 may process a group of requests 202 at the same time. For example, a group of n GPU threads 212 such as GPU thread 212.1 through GPU thread 212.n (with n=64) may monitor an inbound queue 214.1 and when there are 64 requests 202 available on the inbound queue 214.1 the group of GPU thread 212.1 through GPU thread 212.64 may at the same time process the 64 requests 202. In some embodiments, one of the GPU threads 212 of the group of n GPU threads 212 may monitor the inbound queue 214 for the group of n GPU threads 212. The GPU threads 212 may be running the same kernel or program or be configured to process the requests 202 in the same way. The GPU threads 212 may send the response 204 to the outbound queue 210.

The inbound queue 214 may be one or more queues where requests 202 are placed. The inbound queue 214 may reside in a memory 138 or another memory. The GPU data structure 218 may be a data structure 218 that resides in a memory associated with the GPU 130. The GPU data structure 218 may be constructed based on one or more sets 220 and may be based on additional information. The GPU data structure 218 may include pointer 224 that may be a pointer 224 that may be used to retrieve data 222 from the CPU data structure 216. The GPU data structure 218 may be used by the GPU 130 to process the requests 202. In some embodiments, the GPU data structure 218 may reside in memory 138, and or memory 104, or another memory (not illustrated) associated with the GPU 130.

The CPU data structure 216 may be a data structure 216 that resides in a memory associated with the CPU 128. The CPU data structure 216 may be constructed based on one or more sets 220 and may be based on additional information. The CPU data structure 216 may include data 222 that may be data 222 that is pointed to by a pointer 224. The CPU data structure 216 may be used by the CPU 128 to process the requests 202. In some embodiments, the CPU data structure 216 may reside in memory 136, and or memory 104 (see FIG. 1), or another memory (not illustrated) associated with the CPU 128.

Figure 3:
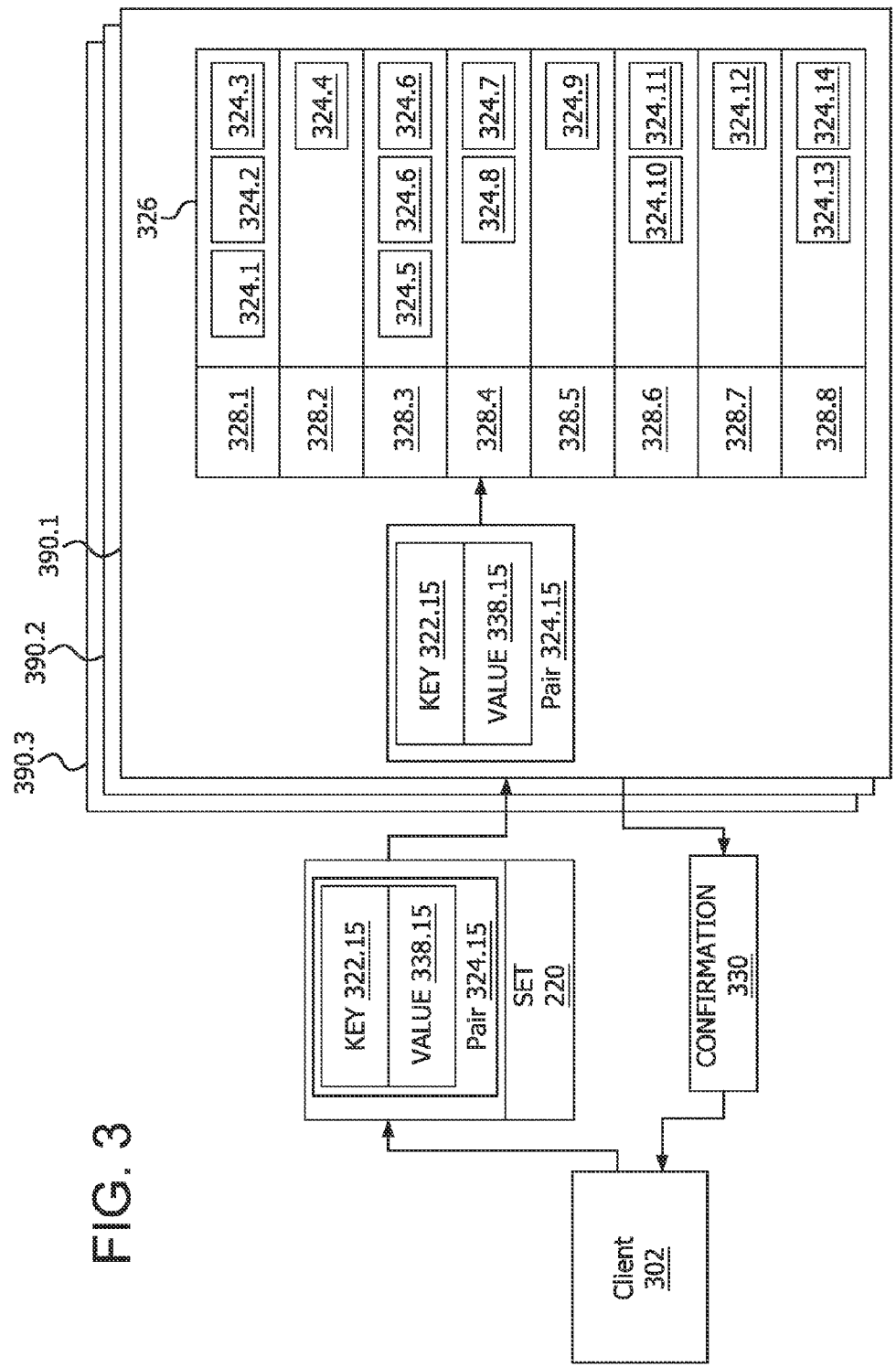
FIGS. 3 and 4 schematically illustrate the operation of a memory cache application that may need a low latency for responding to requests.
Figure 4:
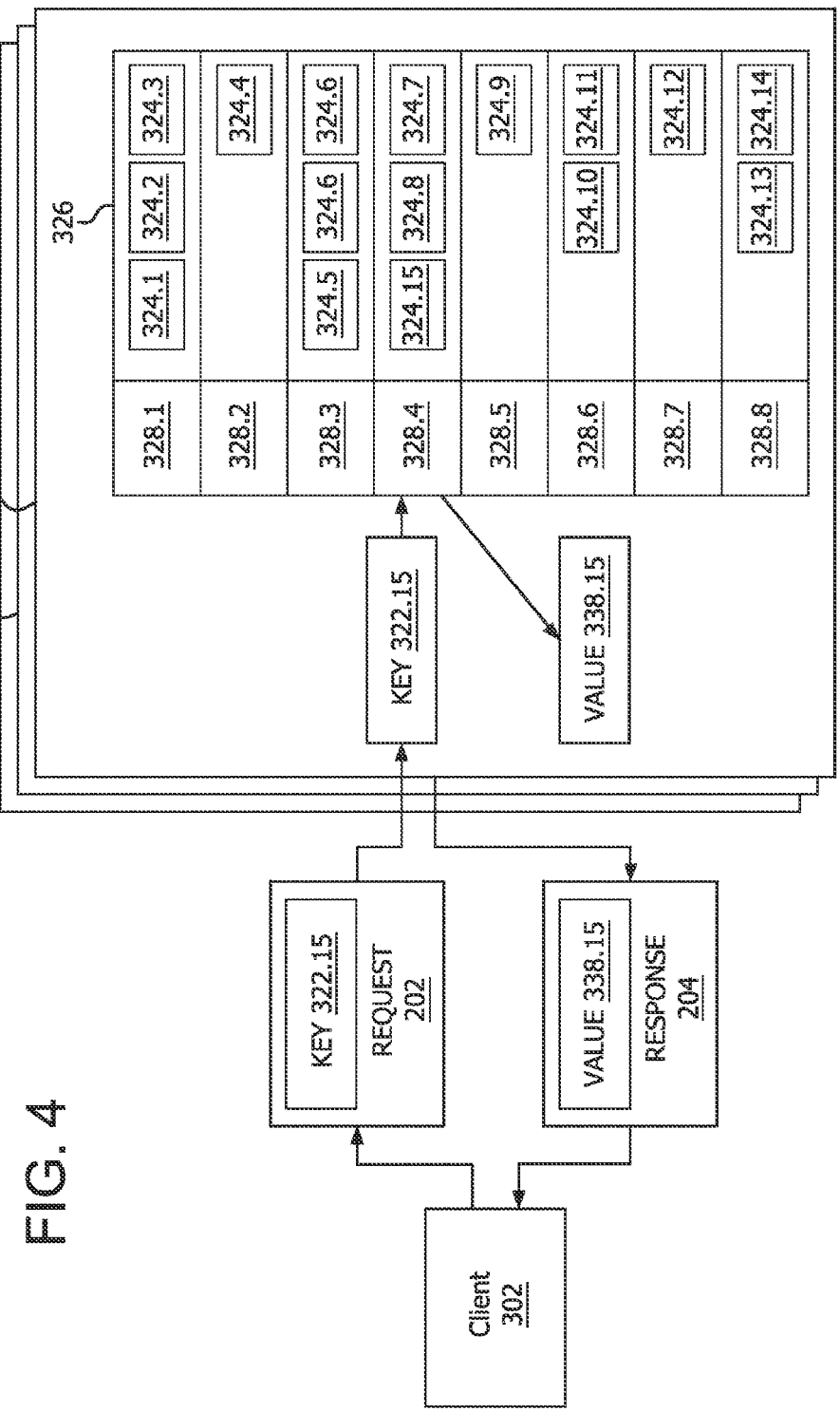

FIGS. 3 and 4 schematically illustrate the operation of a memory cache application that may need a low latency for responding to requests. Illustrated in FIGS. 3 and 4 are a client 302, a set 220, a confirmation 330, servers 390, a hash table 326, and a request 202 and response 204. A client 302 selects a server 390 and then sends the selected server 390.1 a set 220, which may be a command to associate a value 338.15 with the key 322.15. The memory cache application (not illustrated) receives the set 220 and stores the value 338.15 associated with the key 322.15 in a data structure that may be a hash table 326 and may send a confirmation 330 to the client 302. The client 302 can then send a request 202 with the key 322.15 (see FIG. 4) and the server 390.1 sends a response 204 with the value 338.15 associated with the key 322.15 by searching the hash table 326.

The client 302 may communicate with the server 390.1 via a communication network such as a LAN or the Internet (not illustrated). In some embodiments, the client 302 may be resident on the server 390.1. The set 220 may be a command that includes a pair 324 of key 322 and value 338. The key 322 and value 338 may be data. The key 322 may be a unique way of identifying the value 338. The confirmation 330 may be an indication of whether or not the set 220 was successful or not. The hash table 326 may be a table that associates indexes 328 to a pair 324 of key 322 and value 338.

The client 302 may select a server 390. In some embodiments, the client 302 selects the server 390 based on the key 322. For example, the client 302 may determine the server 390 based on determining a hash value of the key 322 such as a modulus of the key 322. For example, the server 390 may be selected based on determining the value of (key 322 modulus 3)+1 when there are three servers 390 as illustrated in FIG. 3.

The client 302 may then send a set 220 to the server 390.1. The memory cache application (not illustrated) may determine an index 328 of the key 322, which in some embodiments is called determining a hash value. For example, if the hash table is 9 entries the memory cache application may determine the index to be [key 322 modulus 9]+1 so that a key 322 with a value of 30 would have a hash value or index of [30 mod 9]+1=4. The memory cache application will then store the pair 324.15 of key 322.15 and value 338.15 in the hash table 326. Each of the indexes 328 may have a chain of pairs 324 that may need to be traversed to search for the pair 324.

In this way the client 302 may have the server 390.1 build a hash table 326 that stores pairs 324 of key 322 and value 338. The client 302 may retrieve values 338 associated with keys 322 by selecting a server 390 based on the key 322 as described above and then send a request 202 to the server 390.1 with a key 322.15 (see FIG. 4). The server 390.1 then takes the key 322.15 and computes the hash value of the key 322.15 to determine an index 328.4 and then searches the pairs 324 associated with the index 328.4 for the pair 324.15 with key 322.15. When the key 322.15 is found, the memory cache application retrieves the value 338.15 and sends the client 302 a response 204 with the value 338.15.

Thus, clients 302 can set 220 pairs 324 of key 322 and value 338 in the hash table 326 and request 202 values 338 from the hash table 326 using a key 322. In some embodiments, the hash table 326 may be large and the hash table 326 may be stored in a random access memory such as 104, 136, or 138 (see FIG. 1), so that the request 202 may be quick. In some embodiments, it may be important that the set 220 and/or the request 202 command are performed quickly so that there is a low latency between when the client 302 requests 202 a value 338 and when a value 338 is actually returned in a response 204. For example, the hash table 326 may be used to store network addresses for routing which requires very quick responses 204.

Figure 5:
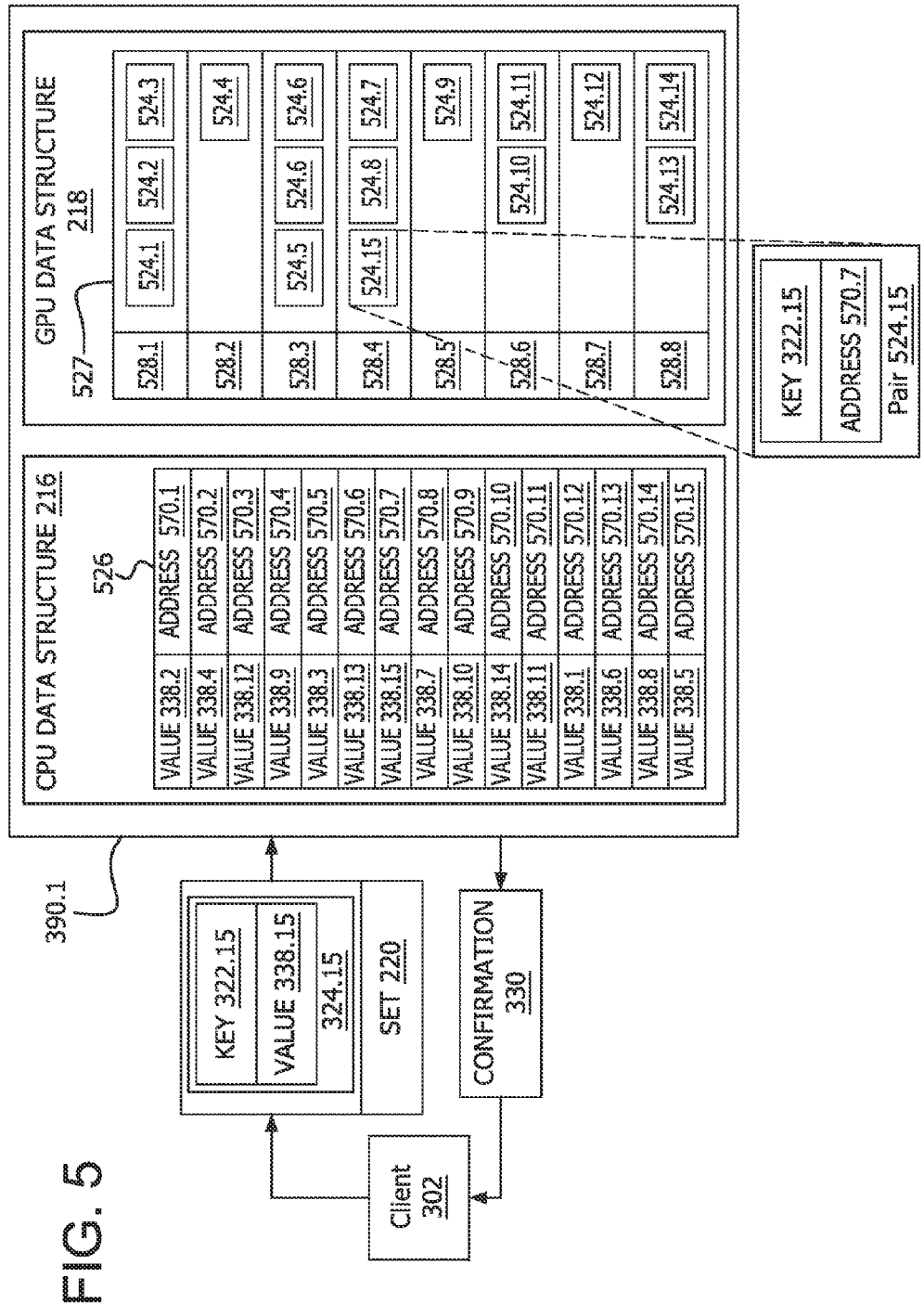
FIGS. 5 and 6 illustrate the operation of a system for low latency applications using heterogeneous processors for a memory cache application according to some disclosed embodiments.
Figure 6:
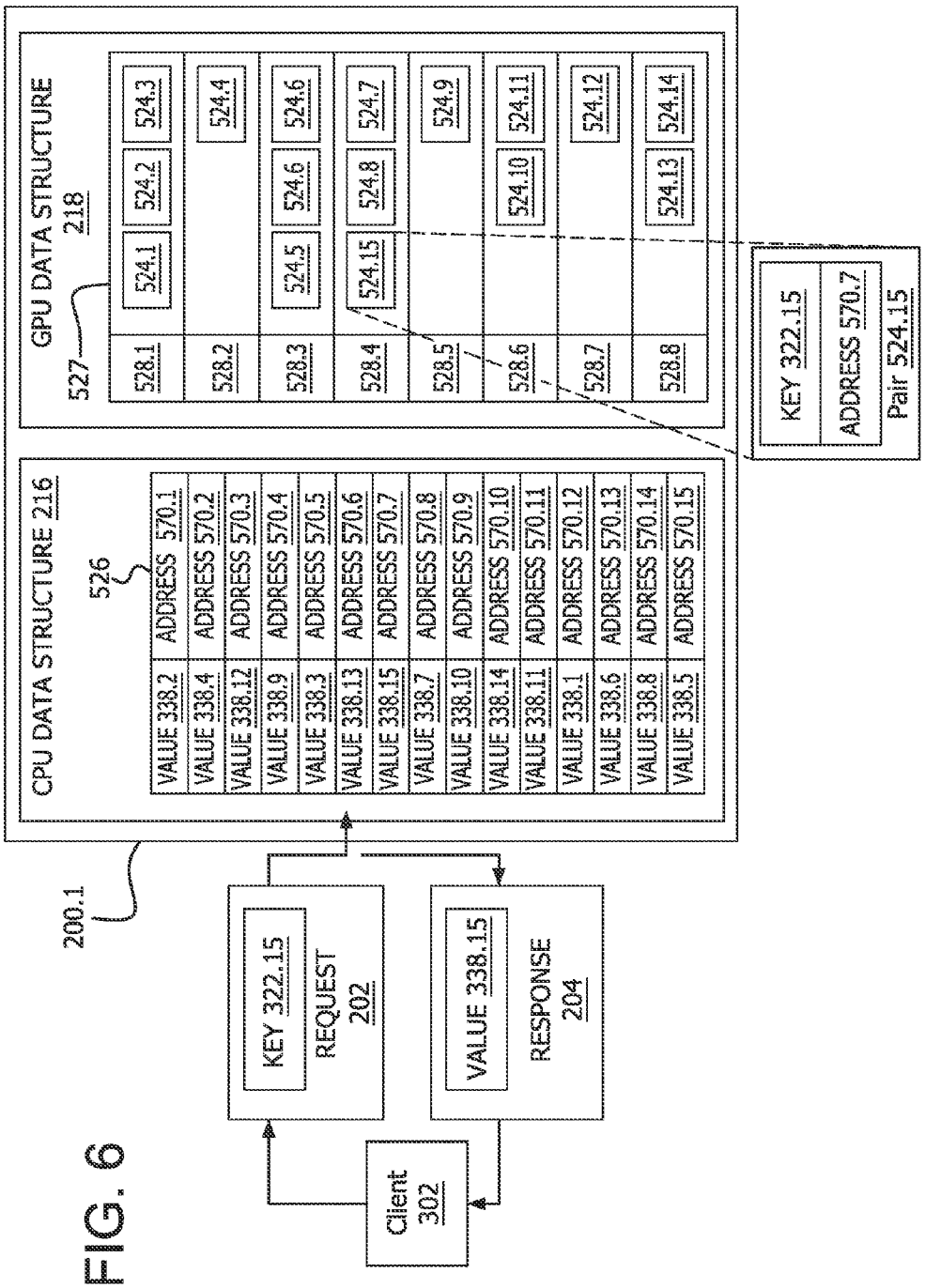

FIGS. 5 and 6 illustrate the operation of a system for low latency applications using heterogeneous processors for a memory cache application according to some disclosed embodiments. Illustrated in FIGS. 5 and 6 are a client 302, a set 220, a confirmation 330, server 390.1, a CPU data structure 216, a GPU data structure 218, and (see FIG. 6) a request 202 and response 204. The CPU data structure 216 may be a data structure with addresses 570 and values 338. The values 338 may be set or retrieved using the addresses 570. The GPU data structure 218 includes pairs 524 of a key 322 and an address 570 that are accessed by indexes 528. In some embodiments, the GPU data structure 218 may be a hash table 527.

The operation of the memory cache application from the perspective of the client 302 is the same as described in conjunction with FIGS. 3 and 4. Referring to FIGS. 2 and 5, in operation, the client 302 sends a set 220 to the server 390.1. A network thread 206 of the server 390.1 sends the set 220 to a host thread 208. The host thread 208 sets the value 338.15 at address 570.7 of CPU data structure 216. The host thread 208 then places in an inbound queue 214 the pair 524.15 of key 322.15 and address 570.7. In some embodiments, the host thread 208 may determine which inbound queue 214 to place the pair 524.15 on based on the contents of the inbound queues 214. A GPU thread 212 then determines the index 528 for the key 322.15 and places the pair 524.15 of key 322.15 and address 570.7 in the hash table 527 at the index 528, which is index 528.4 as illustrated in FIG. 5. In some embodiments, the pairs 524 may be stored in the hash table 527 as a linked list associated with the index 528. A confirmation 330 may be sent to the client 302 that the set 220 was successful.

Referring to FIGS. 2 and 6, the client 302 may send a request 202 to the server 390.1. The network thread 206 may receive the request 202. The network thread 206 may send the request 202 to the host thread 208. The host thread 208 may place the request 202 in an inbound queue 214. A GPU thread 212 may process the request 202 by determining the index 528 that corresponds to the key 322. As illustrated in FIG. 6, the index 528.4 corresponds to the key 322.15 and the GPU thread 212 may search a list to find the pair 524.15 of key 322.15 and address 570.7. The GPU thread 212 may then move the pair 524.15 of key 322.15 and address 570.7 to the outbound queue 210. The host thread 208 may then use the address 570.7 to retrieve the value 338.15 from the CPU data structure 216. The host thread 208 may then indicate to the network thread 206 that the response 204 with value 338.15 should be sent to the client 302. The network thread 206 may then send the response 204 with the value 338.15 to the client 302.

In some disclosed embodiments, the CPU data structure 216 may reside in memory 136. In some disclosed embodiments, the GPU data structure 218 may reside in memory 138. Some disclosed embodiments have the advantage that the values 338, which may be a large amount of data, may not need to be transferred to a memory such as memory 138 which may be time consuming.

In some disclosed embodiments, there may be many more requests 202 than CPU 128 cores 132. In some disclosed embodiments, a number of requests 202 is queued in an inbound queue 214 until the number of requests 202 is equal to or greater than the number of compute units 134 of the GPU 130 and then one or more requests 202 is allocated to each of the compute units 134 of the GPU 130.

In some disclosed embodiments, the CPU 128 and GPU 130 communicate using atomic read/write instructions. In some disclosed embodiments, the GPU 130 polls a memory location to get an inbound queue pointer written by the CPU 128. In some embodiments, a thread of the threads running on the GPU 130 may poll a memory location for updates to the inbound queue 214. In some disclosed embodiments, the GPU 130 updates the outbound queue 210 by writing a pointer to a memory location that the CPU 128 polls.

In some disclosed embodiments, the GPU threads 212 may be persistent threads that remain active as long as a kernel remains active. The kernel may have an infinite outer loop that responds to a shutdown message. In some disclosed embodiments, OpenCL may be used with two persistent threads per compute unit 134 of the GPU 130. Two persistent threads per compute unit 134 may provide the advantage that while a first thread may be waiting for data to arrive a second thread may execute.

Figure 7:
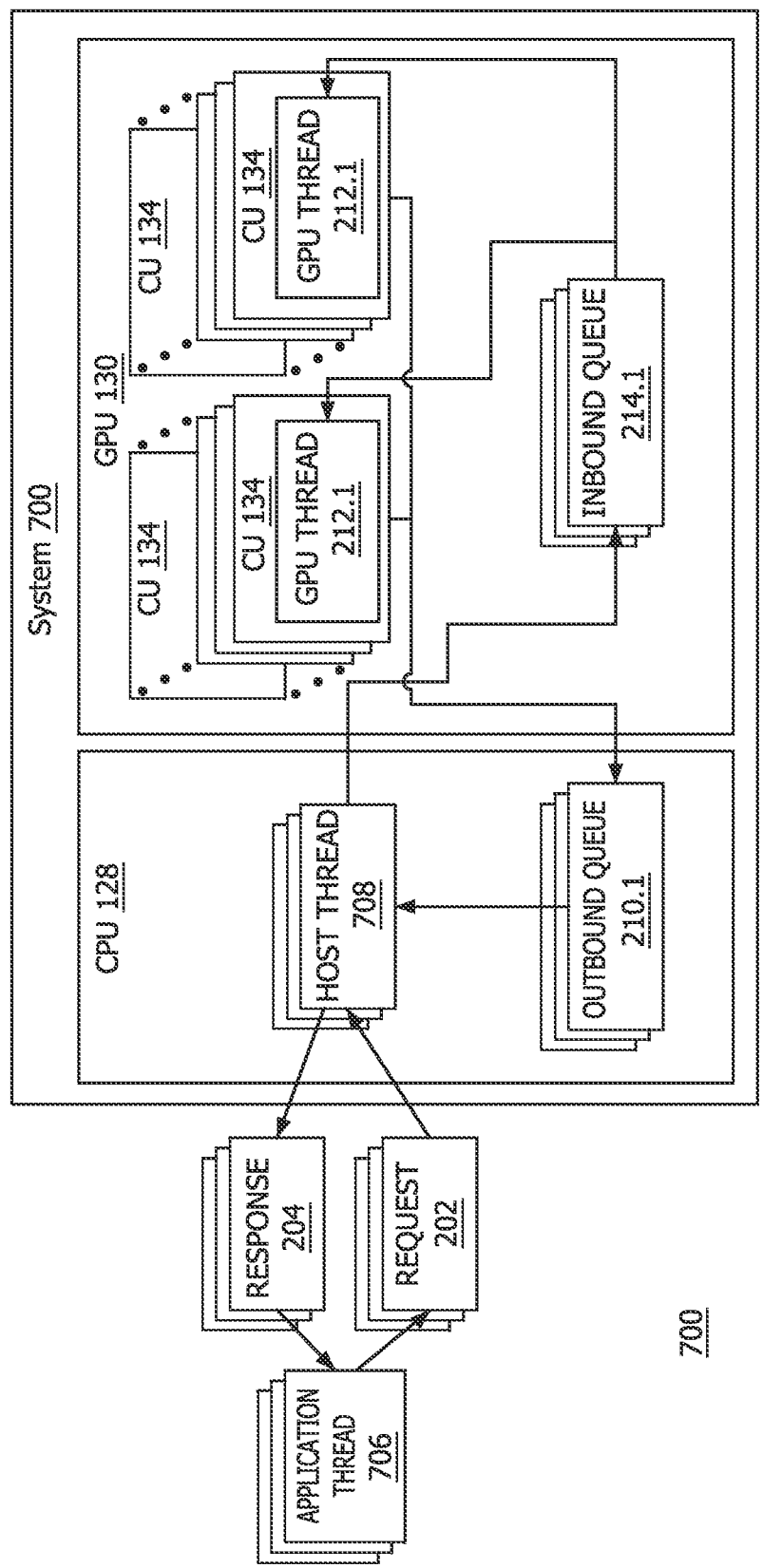
FIG. 7 schematically illustrates an embodiment of a system for low latencies applications using heterogeneous processors according to some disclosed embodiments.

FIG. 7 schematically illustrates an embodiment of a system for low latencies applications using heterogeneous processors. The system 700 includes CPU 128, host thread 708, outbound queue 210, GPU 130, GPU threads 212, inbound queue 214. The application thread 706 may send a request 202 and the system 700 may process the request 202 and send a response 204 to the application thread 706.

The application thread 706 may be an application that runs on the CPU 128 or another CPU 128. The request 202 may be a request for a processing task. For example, the set 220 and request 202 as disclosed in conjunction with the memory cache application in conjunction with FIGS. 3, 4, 5, and 6. The response 204 may be a response to the request 202. For example, the response 204 may be the response 204 as disclosed in conjunction with the memory cache application.

The host thread 708 may be a thread that receives requests 202 and sends responses 204. In some embodiments, the application thread 706 may be a cryptology application, a network application, and an embedded application.

FIG. 8 illustrates a kernel that the GPUs may run according to some disclosed embodiments. The GPU threads 212 (see FIG. 2) may be running the gpuGenericApplication kernel 800 which enables a generic application to be run by the GPU threads 212. The kernel 800 has a flow control of an infinite do loop from 804 to 816 that may be broken by a breaking signal such as EOS in OpenCL®. The kernel 800 reads _in_control_queue, which may be the inbound queue 214, at 805 and sets read_ptr to the first request 202 in _in_control_queue. The kernel 800 then loops in a while loop while there are requests in the _in_control_queue at 806. The kernel 800 calls an application at 808 according to the request 202 pointed to by curr_ptr. The kernel 800 puts the response on _out_control_queue, which may be the outbound queue 210 at 810. The kernel 800 increments the curr_ptr++ at 812. The kernel 800 then loops back to 806 if curr_ptr points to a request 202 in the in_control_queue that needs to be serviced. If curr_ptr does not point to a request 202, then the kernel 800 continues to 814 and updates the protocol_control. The kernel 800 then checks at 816 whether or not a breaking signal EOS was received at 816. If a breaking signal EOS was received, then the kernel 800 ends. Otherwise, the kernel 800 loops back to 804. The kernel 800 has the advantage that it can be called once and remain persistent to respond to many requests 202.

FIG. 9 illustrates a data structure and call for calling the system for low latency applications for heterogeneous processors according to some disclosed embodiments. A structure 902 named LOLALY_REQ may be populated with an application id 903 and callback function 904. Then a lolalySendRequest 906 may be used to perform a request 202 to the system 700.

FIG. 10 illustrates a table of results of empirical tests of a system and method for providing low latency using heterogeneous processors for memory cache application. The table 1000 include a request size 1002 and then two sets of data one for AMD®'s product the APU Brazos™, HD631/430 1004 and for AMD®'s product the AP Trinity™, HD7660/600. For example, with 2048 requests 1020 the APU Brazos™ has a latency 1010 of 197 μL seconds, and a throughput MRs 1006 of 0.19 and bandwidth GB 1008 of 3.23. With 2048 requests 1020, the AP Trinity™ has a latency 1018 of 140 µseconds with a throughput MRs 1014 of 0.31 and bandwidth GBs 1016 of 5.26. Thus even with a large number of requests the system provides for an acceptable latency.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a graphics processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage medium is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for responding to requests in a multi-processor computer system, the method comprising:
    receiving, by one or more processors of a first type, one or more requests, each request having a key value, wherein the one or more processors of the first type are associated with a first memory and the first memory comprises a first data structure having a plurality of data values, each data value corresponding to one of a plurality of locations in the first memory;
    moving the one or more requests from the first memory associated with the one or more processors of the first type to a second memory associated with one or more processors of a second type, wherein the second memory comprises a second data structure and the second data structure includes:
        (i) a plurality of pair values, each pair value comprising one of a plurality of key values and one of the plurality of locations in the first memory, and
        (ii) a plurality of index values each corresponding to one or more of the plurality of pair values, each pointer comprises an index value;
    storing in the second data structure, at each index value, one or more of the plurality of pair values each having one of the locations in the first memory where a corresponding data value is stored;
    modifying the second data structure in the second memory by the one or more processors of the second type based on at least one of the one or more requests;
    determining one or more determined pointers for each of the one or more requests by the one or more processors of the second type, wherein each of the one or more determined pointers corresponds to the key value and a corresponding location of a data value in the first memory, wherein each of the one or more determined pointers comprises a pointer value determined from the key value in each corresponding request;
    moving the key value and the corresponding location to the first memory;
    for each of the one or more determined pointers, retrieving, by the one or more processors of the first type, retrieved data for one or more data values pointed to by the one or more determined pointers, wherein the retrieved data is retrieved from the first data structure in the first memory at the corresponding location in the first memory; and
    responding to the one or more requests by the one or more processors of the first type sending the retrieved data.

2. The method of claim 1, wherein the one or more processors of the first type include one or more central processor unit (CPU) cores and the one or more processors of the second type include one or more graphical processor unit (GPU) cores.

3. The method of claim 2, wherein each of the one or more GPU cores is running a persistent thread based on a GPU kernel.

4. The method of claim 2, wherein the one or more GPU cores access the second memory faster than the one or more CPU cores access the second memory.

5. The method of claim 2, wherein a first access time of the first memory for the one or more CPU cores is less than a second access time of the first memory for the one or more GPU cores.

6. The method of claim 1, further comprising:
    receiving a set request by the one or more processors of the first type; and
    modifying the first data structure by the one or more processors of the first type based on the set request.

7. The method of claim 1, wherein moving further comprises:
    moving the one or more requests from the first memory to the second memory when a number of requests reaches a threshold number.

8. The method of claim 1, wherein a size of one data value of the plurality of data values is larger than a size of one pointer value of the one or more determined pointer.

9. A method of responding to requests in a multi-processor computer system, the method comprising:
    receiving one or more requests the one or more requests each including a callback function and having a key value, wherein the one or more requests are received in a first memory associated with one or more central processor unit (CPU) cores, wherein the first memory comprises a first data structure having a plurality of data values, each data value corresponding to one of a plurality of locations in the first memory;
    moving the one or more requests to a second memory, wherein the second memory is associated with one or more graphical processor unit (GPU) cores and the second memory comprises a second data structure and the second data structure includes:

(i) a plurality of pair values, each pair value comprising one of a plurality of key values and one of the plurality of locations in the first memory, and (ii) a plurality of index values each corresponding to one or more of the plurality of pair values, each pointer comprises an index value;

storing in the second data structure, at each index value, one or more of the plurality of pair values each having one of the locations in the first memory where a corresponding data value is stored;

modifying the second data structure in the second memory by the one or more GPU cores based on at least one of the one or more requests;

determining one or more determined pointers for each of the one or more requests when a number of requests is at least a threshold number, wherein each of the one or more determined pointers corresponds to the key value and a corresponding location of a data value in the first memory, wherein each of the one or more determined pointer comprises a pointer value determined from the key value in each corresponding request;

moving the key value and the corresponding location to the first memory;

for each of the one or more determined pointers, retrieving, by the one or more CPU cores, retrieved data for one or more data value pointed to by the one or more determined pointers, wherein the retrieved data is retrieved from the first memory at the corresponding location in the first memory; and executing, by the one or more CPU cores, each of the one or more requests with the retrieved data using the callback function of the one or more requests.

10. The method of claim 9, wherein an access time for the second memory is less for the one or more GPU cores than the one or more CPU cores.

11. The method of claim 9, wherein moving the one or more requests to the second memory includes:

moving the requests to an inbound queue in the second memory.

12. The method of claim 11, wherein when the number of requests is at least the threshold number and the GPU includes one or more GPU threads, the processing includes:

checking the inbound queue in the second memory by a GPU thread of the one or more GPU threads to determine when the number of requests is at least the threshold number, wherein the GPU thread is a persistent GPU thread.

13. The method of claim 9, wherein moving the retrieved data to the first memory includes:

moving the retrieved data to an outbound queue in the first memory.

14. A multi-processor computer system for responding to requests, comprising:

one or more processors of a first type, wherein the one or more processors of the first type are associated with a first memory and the first memory comprises a first data structure having a plurality of data values, each data value corresponding to one of a plurality of locations in the first memory;

one or more processors of a second type, wherein the one or more processors of the second type are associated with a second memory; and the second memory comprises a second data structure and the second data structure includes:

(i) a plurality of pair values, each pair value comprising one of a plurality of key values and one of the plurality of locations in the first memory, and (ii) a plurality of index values each corresponding to one or more of the plurality of pair values, each pointer comprises an index value;

storing in the second data structure, at each index value, one or more of the plurality of pair values each having one of the locations in the first memory where a corresponding data value is stored;

wherein the one or more processors of the first type are configured to:

receive one or more requests including a callback function and each having a key value, and move the one or more requests to the second memory, the one or more processors of the second type are configured to:

modify the second data structure in the second memory based on at least one of the one or more requests;

determine one or more determined pointers for each of the one or more requests when a number of requests is at least a threshold number, wherein each of the one or more determined pointers corresponds to the key value and a corresponding location of a data value in the first memory, wherein each of the one or more determined pointers comprises a pointer value determined from the key value in each corresponding request, and move the key value and the corresponding location held at each of the determined pointers to the first memory;

wherein the one or more processors of the first type are further configured to:

for each of the one or more determined pointers, retrieve retrieved data for one or more data value pointed to by the one or more determined pointers, wherein the retrieved data is retrieved from the first memory at the corresponding location in the first memory; and executes each of the one or more requests with the retrieved data using the callback function of the one or more requests.

15. The system of claim 14, wherein:

the one or more processors of the first type include one or more central processor unit (CPU) cores, and the one or more processors of the second type include one or more graphical processor unit (GPU) cores.

16. The system of claim 15, wherein the one or more GPU threads are persistent threads based on a GPU kernel.

17. The system of claim 14, wherein an access time for the second memory is less for the one or more processors of the second type than the one or more processors of the first type.

18. The system of claim 14, wherein the one or more processors of the first type are further configured to move the one or more requests to an inbound queue in the second memory.

19. The system of claim 18, wherein:

the one or more processors of the second type are further configured to execute a thread to check the inbound queue in the second memory to determine when the number of requests is at least the threshold number, and the thread is a persistent thread.

20. The system of claim 14, wherein the one or more processors of the second type are further configured to move the retrieved data to an outbound queue in the first memory.

* * * * *